(12) United States Patent
Kumagai

(10) Patent No.: US 9,110,228 B2
(45) Date of Patent: Aug. 18, 2015

(54) FILM MIRROR, FILM MIRROR FOR SOLAR POWER GENERATION AND REFLECTION DEVICE FOR SOLAR POWER GENERATION

(75) Inventor: Takenori Kumagai, Tokyo (JP)

(73) Assignee: KONICA MINOLTA ADVANCED LAYERS, INC., Tokyo (JP)

( * ) Notice: Subject to any disclaimer, the term of this patent is extended or adjusted under 35 U.S.C. 154(b) by 298 days.

(21) Appl. No.: 13/574,806

(22) PCT Filed: Jan. 27, 2011

(86) PCT No.: PCT/JP2011/051566
§ 371 (c)(1),
(2), (4) Date: Jul. 24, 2012

(87) PCT Pub. No.: WO2011/096320
PCT Pub. Date: Aug. 11, 2011

(65) Prior Publication Data
US 2012/0287521 A1 Nov. 15, 2012

(30) Foreign Application Priority Data

Feb. 5, 2010 (JP) ................................ 2010-023945
Mar. 27, 2010 (JP) ................................ 2010-073924

(51) Int. Cl.
*G02B 1/14* (2015.01)
*G02B 5/08* (2006.01)
(Continued)

(52) U.S. Cl.
CPC . *G02B 1/105* (2013.01); *F24J 2/16* (2013.01); *F24J 2/18* (2013.01); *G02B 1/14* (2015.01); *G02B 5/0808* (2013.01); *F24J 2002/1071* (2013.01); *Y02E 10/40* (2013.01)

(58) Field of Classification Search
CPC ................................ G02B 1/14; G02B 5/0808
USPC .................................. 359/360, 883, 884, 361
See application file for complete search history.

(56) References Cited

U.S. PATENT DOCUMENTS 4,098,840 A * 7/1978 Yoshida et al. ................ 525/102
4,266,053 A * 5/1981 Imanaka et al. ............... 544/196
(Continued)

FOREIGN PATENT DOCUMENTS

| EP | 0 990 928 | 4/2000 |
| EP | 1 724 741 | 11/2006 |

(Continued)

OTHER PUBLICATIONS

Supplementary Partial European Search Report, EP 11 73 9669, date: Aug. 10, 2013 (9 pages).
(Continued)

*Primary Examiner* — Ricky D Shafer
(74) *Attorney, Agent, or Firm* — Lucas & Mercanti, LLP

(57) ABSTRACT

A film mirror which is excellent in anti-staining and scratch resistance and can maintain good specular reflectance for sunlight over long period of time is disclosed, comprising a silver reflection layer provided on at least one side of a resin substrate, wherein the film mirror comprises an outermost layer on a light incident side and a surface of the outermost layer exhibits an electric surface resistivity value of $1.0 \times 10^{-3}$ to $1.1 \times 10^9$ ohms per square, a pencil hardness of not less than H and less than 6H, and not more than 30 scratches in a steel wool test under a load of 500 g/cm$^2$, and also disclosed are a production method thereof and a reflection device for solar power generation by use thereof.

9 Claims, 4 Drawing Sheets

(51) Int. Cl.
  *G02B 1/10* (2015.01)
  *F24J 2/16* (2006.01)
  *F24J 2/18* (2006.01)
  *F24J 2/10* (2006.01)

(56) References Cited

U.S. PATENT DOCUMENTS

| | | | | |
|---|---|---|---|---|
| 8,064,014 | B2* | 11/2011 | Tatsumi et al. | 349/113 |
| 2007/0173564 | A1* | 7/2007 | Sohn et al. | 523/210 |
| 2008/0151549 | A1* | 6/2008 | Hsu | 362/296 |
| 2009/0017277 | A1 | 1/2009 | Nakahira | |
| 2009/0020712 | A1* | 1/2009 | Matsumoto | 250/515.1 |
| 2010/0273009 | A1* | 10/2010 | Roumonis | 428/425.9 |
| 2013/0155497 | A1* | 6/2013 | Mochizuki | 359/361 |
| 2014/0133028 | A1* | 5/2014 | Kumagai | 359/507 |

FOREIGN PATENT DOCUMENTS

| | | |
|---|---|---|
| JP | 31-154942 | 7/1986 |
| JP | 2000-249815 | 9/2000 |
| JP | 2001-051610 | 2/2001 |
| JP | 2005-125627 | 5/2005 |
| JP | 2005-181549 | 7/2005 |
| JP | 2006-012317 | 1/2006 |
| JP | 2006-326971 | 7/2006 |
| JP | 2007-284622 | 11/2007 |
| JP | 2008-127413 | 6/2008 |
| JP | 2008-304795 | 12/2008 |
| JP | 2009-520174 | 5/2009 |

OTHER PUBLICATIONS

Japanese Office Action, Notification of Reasons for Refusal, Patent Application No. P2011-552744. Drafting Date: Jun. 16, 2014 (3 pages).

English translation of Japanese Office Action, Notification of Reasons for Refusal, Patent Application No. P2011-552744. Drafting Date: Jun. 16, 2014 (3 pages).

* cited by examiner

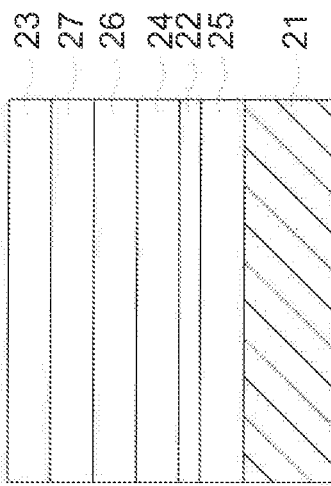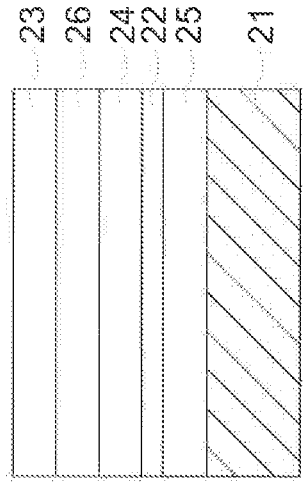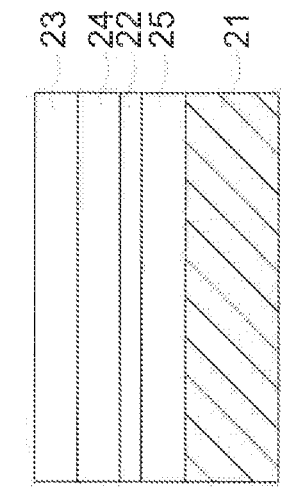

FILM MIRROR, FILM MIRROR FOR SOLAR POWER GENERATION AND REFLECTION DEVICE FOR SOLAR POWER GENERATION

CROSS REFERENCE TO RELATED APPLICATION

This Application is a 371 of PCT/JP2011/051566 filed on Jan. 27, 2011 which claimed the priority of Japanese Patent Application No. 2010-023945 filed on Feb. 5, 2010, and JP 2010-073924 filed on Mar. 27, 2010, all three Applications are incorporated by reference herein.

TECHNICAL FIELD

The present invention relates to a film mirror for use in solar power generation and a reflection device for solar power generation using a film mirror, and in particular to a film mirror for solar power generation which is superior in stain resistance and weather resistance and capable of maintaining excellent specular reflectance for solar light over a long duration, and a reflection device for solar power generation.

TECHNICAL BACKGROUND

In recent years, there has been studied employment of natural energy as alternate energy for fossil fuel such as petroleum, natural gas or the like. Among them, solar energy is noted which is most stable as alternate energy for fossil fuel and in a large energy amount.

However, although solar energy is very important alternative energy, it supposedly becomes a problem that (1) the energy density of solar energy is low and (2) storage and transfer of solar energy are difficult.

In recent years, research and development of solar cells have been actively made and solar light use efficiency has been increased, but there has not been achieved sufficient recovery efficiency.

As an alternate system for conversion of solar light to energy is noted solar power generation in which solar light is reflected and condensed through a mirror and electric power is generated through obtained heat. The use of this system makes it feasible to generate electric power at any time during the day or night and the power generation efficiency is thought to be higher than solar cells from the long-term view point, rendering it feasible to perform efficient employment of solar light.

A glass mirror employing a glass substrate is currently employed as a mirror for use in solar power generation but has problems such as being rather heavier, requiring a large volume, high transport cost and being fragile. Accordingly, the use of a resin mirror as an alternate to glass makes it possible to be lighter and not generating problems such as being broken, so that a film mirror in which the mirror is produced in a film form has been noted.

A high reflectance of a mirror is required to achieve enhanced power generation efficiency. Therefore, it is preferred to use, as the reflection surface of a mirror, silver which exhibits the highest reflectance of metals but silver has the defect of being easily corroded by environmental factors. Due to this, it is designed that a thick resin layer is provided between the solar light incident side and the mirror surface to protect silver.

On the other hand, a solar power generation plant is built in an area with a high amount of daily solar radiation, for example, in the desert, where there is the problem such that a sand dust adheres to the mirror surface, resulting in a lowering of reflectance with age. Further, the temperature difference between day and night is large, so that, in an area, a large amount of dew condensation water is generated on the mirror surface in the morning time, mixed with sand or clay, and dried, which stains the mirror surface, resulting in a lowering of reflectance. Specifically, in the case of a film mirror, a resin layer is provided on the outermost surface thereof so that the surface is strongly electric-charged, resulting in increased adsorption of stains. Therefore, in a plant under construction, after water is applied to the mirror surface at regular intervals, stains are removed by brushing, however, a large amount of water is used for washing and human labor is also required for washing, resulting in increased washing costs. Further, in cases when the surface hardness of the film surface is not sufficient, the film surface is damaged after being brushed, resulting in a lowering of reflectance. Therefore, it is expected that if the surface of a film mirror is subjected to a treatment combining hardness and anti-staining, stains are less likely to adhere and flawing during washing decreases, rendering it feasible to maintain a high reflectance over long duration.

Although there were reported film mirrors for solar power generation (for example, patent documents 1 and 2), it is supposed that since an acryl resin layer is provided on the outermost surface of the film, sand or clay strongly adheres to the surface, rendering it difficult to maintain enhanced reflectance over long duration.

PRIOR ART LITERATURE

Patent Document

Patent document 1: JP 2009-520174 W
Patent document 2: JP 2008-127413 A

SUMMARY OF THE INVENTION

Problems to be Solved

A film mirror for solar power generation is a feature in that it is light and flexible, low in production cost and can cover a large area and mass production becomes feasible; however, dust-staining on the mirror surface is marked, as is in deserts, and installation in an almost rainless environment over long period results in reduced specular reflectance. Specifically, in the film mirror in which a resin is provided near the surface, the surface is strongly electrostatic-charged and stains further adhere easily to the surface. In cases when staining is marked, specular reflectance is recovered by washing stains off with a brush, but which damages the surface after being brushed, resulting a lowering of specular reflectance, as compared to the initial stage. Therefore, the object of the present invention is to provide a film mirror in which a lowering of specular reflectance caused by staining is small, the surface is difficult to be damaged by dust and good specular reflectance for sunlight can be maintained over a long period, and a production method of the same and a reflection device for use in a solar power generation.

Means for Solving the Problems

The foregoing object of the present invention can be realized by the following constitution.
1. A film mirror comprising a resin substrate and a silver reflection layer provided on at least one side of the resin substrate, wherein the film mirror comprises an outermost layer on the light incident side and the surface of the outermost layer exhibits an electric surface resistivity value of 1. $1.0\times10^{-3}$ to $1.1\times10^9$ ohms per square, a pencil hardness of not less than H and less than 6H, and not more than 30 scratches in a steel wool test under a load of 500 g/cm².
2. The film mirror, as described in the foregoing 1, wherein the outermost layer contains inorganic double oxide particles.
3. The film mirror as described in the foregoing 1 or 2, wherein the outermost layer contains an acrylate or urethane resin.
4. The film mirror as described in any of the foregoing 1 to 3, wherein corrosion proof layers for silver are provided on both surfaces of the silver reflection layer.
5. The film mirror as described in the foregoing 4, wherein a gas barrier layer is provided between each of the corrosion resistant layers and the resin substrate.
6. The film mirror as described in any of the foregoing 1 to 5, wherein an ultraviolet absorbent is contained in any layer between the silver reflection layer and the resin substrate or except the silver reflection layer.
7. The film mirror as described in any of the foregoing 1 to 6, wherein the thickness of an entire film mirror is within a range of 75 to 250 µm.
8. A film mirror used for solar power generation, wherein the film mirror as described in any of the foregoing 1 to 7 is a film mirror used for solar power generation.
9. A reflection device for solar power generation, wherein after an adhesive layer is coated on the surface opposite to the light incident side of the film mirror for solar power generation described in the foregoing 8, the film mirror for solar power generation is adhered to a metal substrate through the adhesive layer.

Effect of the Invention

According to the present invention, there can be provided a film mirror which is difficult to stain even when allowed to stand in an almost rainless environment suitable for solar power generation, such as deserts, is superior in abrasion resistance even when washed with a brush, and exhibits excellent specular reflectance to solar light over a long duration, and a reflection device for solar power generation by using the film mirror.

BRIEF DESCRIPTION OF THE DRAWINGS

FIGS. 2a, 2b and 2c each show a sectional view of the layer structure of a film mirror of the front face mirror related to the invention.

EMBODIMENT OF THE INVENTION

In the following, there will be detailed preferred embodiments of the invention but the present invention is not limited to these.

The film mirror related to the invention is characterized in that the film mirror is provided on a resin substrate with at least a silver reflection layer as a constituent layer, the outermost layer (that is the outermost layer provided on the side where the incident light falls) exhibits an electric surface resistivity value of $1.0\times10^{-3}$ to $1.1\times10^9$ ohms per square, a pencil harness of not less than H and less than 6H, and not more than 30 scratches in a steel wool test under a load of 500 g/cm². The form of the film mirror includes a front-face mirror and a rear-face mirror.

Figure 1A:
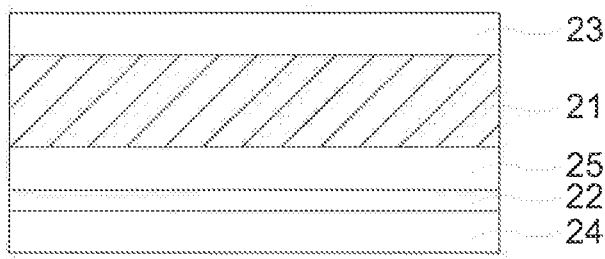
FIGS. 1a, 1b and 1c show the sectional view of the layer structure of a film mirror of the rear face mirror related to the invention.

The foregoing film mirror is used preferably as a film mirror for use in solar power generation, and when the sunlight incident side is supposed to be the front side, the film mirror works as a film mirror used for solar power generation in a rear-face mirror in which the substrate is on the front side from a silver reflection layer, as shown in FIG. 1a or in a front-face mirror in which the substrate is on the rear side from the silver reflection layer, as shown in FIG. 2a.

In the embodiments of the invention, the outermost layer exhibits an antistatic property, rendering it difficult to become soiled, so that stains adhering onto the surface are assumed to be removed by the power of wind or the like. However, when the film mirror is used in an environment such as in a desert over a long duration, complete removal of stains due to desert dust becomes hard, rendering it difficult to maintain enhanced reflectance.

Therefore, periodically washing of the mirror surface with water and a brush is required, in which the outermost surface has scratch resistance, preventing the film surface from scratches even when washed with a brush. Based on these reasons, it is feasible to develop a film mirror which can maintain enhanced reflectance over the long duration.

In the embodiments of the invention, the electric surface resistivity value of the outermost layer is within the range of $1.0\times10^{-3}$ to $1.0\times10^9$ ohms per square to achieve the advantageous effects of the invention.

It is preferred to provide an adhesive layer between a resin substrate and a silver reflection layer to achieve enhance adhesion of the resin substrate to the silver reflection layer.

Further, the foregoing corrosion resistant layers preferably contain a silver-adsorptive corrosion inhibitor (that is a corrosion inhibitor containing a group capable of being adsorbed onto silver).

It is preferred to provide a gas barrier layer on the surface side of the foregoing corrosion proof layer. It is also preferred to provide an ultraviolet absorbent layer on the surface side of the foregoing silver reflection layer or to allow an ultraviolet absorbent to be contained in any of the constituent layers provided on the surface side of the silver reflection layer.

In the invention, the thickness of all layers including the foregoing resin substrate is preferably within the range of 75 to 250 µm.

The production method of the film mirror related to the invention preferably comprises a step of forming the foregoing silver reflection layer through silver vapor deposition.

In the following, there will be described the present invention and its constitution elements and the mode/embodiment for achieving the invention.

Constitutional Outline of Film Mirror:

The outline of the constitution of the film mirror related to the film mirror related to the invention will be described with reference to FIG. 1a.

The film mirror related to the invention is characterized in that at least a silver reflection layer 22, as a constituent layer is provided on a resin substrate 21 and an outermost layer 23 on the surface side combines electric conductivity and scratch resistance. In the embodiments of the invention, it is preferred to provide, as a constituent layer, a gas barrier layer 26, an ultraviolet absorbing layer 23, a corrosion resistant layer 25 and a protective layer 24 in addition to the silver reflection layer 22 and the outermost layer 23.

Further, there may be provided an adhesive layer between the resin substrate 21 and the silver reflection layer 22, or the resin substrate 21 and the corrosion resistant layer 25 to achieve enhanced adhesion between layers. The outermost layer 23 is a hard coat layer which exhibits a pencil hardness of not less than H and less than 6H (preferably, not less than 2H and not more than 6H) and not more than 30 scratches in a steel wool test under a load of 500 g/cm². The outermost layer 23 preferably is a hard coat antistatic layer including an antistatic agent. It is preferred to add a corrosion inhibitor or an antioxidant to allow the layer to function as a corrosion resistant layer or an antioxidant layer. Further, an antioxidant may be added to the corrosion resistant layer 25 to function as an antioxidant layer.

Figure 1B:
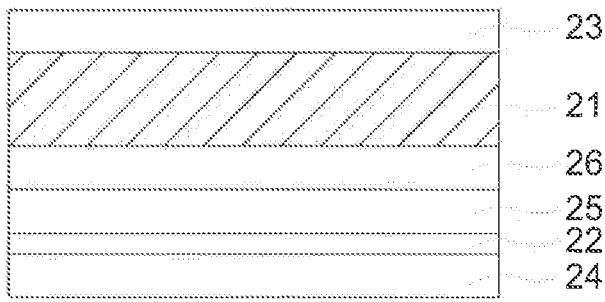
Figure 1C:
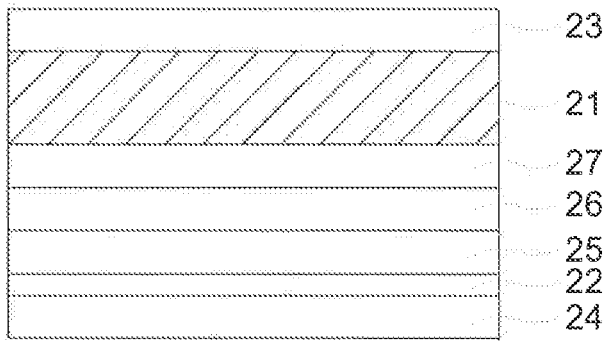

In FIG. 1b, a gas barrier layer 26 is further provided; and, further thereon, an ultraviolet absorbing layer is provided, as shown in FIG. 1c.

Gas Barrier Layer:

The foregoing gas barrier layer is one which prevents the resin substrate and various functional elements protected by the resin substrate from deteriorating by variations of humidity, specifically by high humidity, which may be provided with a special function or use. As long as the foregoing characteristic is maintained, there can be provided gas barrier layers of various forms. In the invention, a gas barrier layer is provided preferably between the corrosion resistant layer 25 and the resin substrate 21.

Moisture resistance of the gas barrier layer is so controlled that a water vapor transmittance at 40° C. and 90% RH is not more than 100 g/m²·day/μm, more preferably not more than 50 g/m²·day/μm, and still more preferably not more than 20 g/m²·day/μm. An oxygen permeability is preferably not more than 0.6 ml/m²/day/atm under measurement temperature of 23° C. and humidity of 90% RH (in which 1 atm is 1.01325×10⁵ Pa).

The method of forming the gas barrier layer related to the present invention is not specifically restricted, but there is preferably used a method in which a ceramic precursor of an inorganic oxide layer is coated and the coated layer is subjected to heating and/or exposure to ultraviolet rays to form an inorganic oxide membrane.

Inorganic Oxide:

An inorganic oxide related to the present invention is characterized in that it is formed from a sol of the foregoing organic metal compound through local heating. Therefore, it is characterized in that such an inorganic oxide is an oxide of an element such as silicon (Si), aluminum (Al), zirconium (Zr), titanium (Ti), tantalum (Ta), zinc (Zn), barium (Ba), indium (In), tin (Sn) or niobium (Nb) which is contained in an organic metal compound.

Such an inorganic oxide is, for example, silicon oxide, aluminum oxide, or zirconium oxide, of which silicon oxide is preferred.

In the present invention, formation of an inorganic oxide from an organic metal compound preferably employs a sol-gel method or a method of coating a polysiloxane.

Precursor of Inorganic Oxide:

The foregoing gas barrier layer can be formed by coating a precursor capable of forming an inorganic oxide upon heating, followed by application of general heating methods, in which formation by local heating is preferred. Such a precursor preferably is an organic metal compound in a sol form or polysiloxane.

Organic Metal Compound:

An organic metal compound related to the present invention preferably contains at least one element selected from the group of silicon (Si), aluminum (Al), lithium (Li), zirconium (Zr), titanium (Ti), tantalum (Ta), zinc (Zn), barium (Ba), indium (In), tin (Sn), lanthanum (La), yttrium (Y), and niobium (Nb). Specifically, the organic metal compound preferably contains at least one element selected from the group of silicon (Si), aluminum (Al), lithium (Li), zirconium (Zr), titanium (Ti), zinc (Zn) and barium (Ba). It is more preferred to contain at least one element selected from the group of silicon (Si), aluminum (Al), and lithium (Li).

Such an organic metal compound may be one which is hydrolysable, and is not specifically limited but a preferable organic compound is a metal alkoxide.

The foregoing metal alkoxide is represented by the following formula (I):

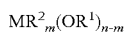 Formula (I):

In the formula (I), M is a metal of an oxidation number of n, $R^1$ and $R^2$ are each independently an alkyl group, and m is an integer of from 0 to (n−1). $R^1$ and $R^2$, which may be the same or different, preferably are each an alkyl group having not less than four carbon atoms. Specifically, a lower alkyl group is preferable, and including, for example, methyl group, $CH_3$ (hereinafter, also denoted as Me), ethyl group, $C_2H_5$ (hereinafter, also denoted as Et), propyl group $C_3H_5$ (hereinafter, also denoted as Pr), isopropyl group $C_3H_5$ (hereinafter, also denoted as i-Pr), butyl group $C_4H_7$ (hereinafter, also denoted as Bu), and isobutyl group $C_4H_7$ (hereinafter, also denoted as i-Bu).

Examples of a suitable metal alkoxide, as represented by the foregoing formula (I) include lithium ethoxide LiOEt, niobium ethoxide Nb(OEt)₅, magnesium isopropoxide Mg(Oi-Pr)₂, aluminum isopropoxide Al(Oi-Pr)₃, zinc propoxide Zn(OPr)₂, tetraethoxysilane Si(OEt)₄, titanium isopropoxide Ti(Oi-Pr), barium ethoxide Ba(OEt)₂, barium isopropoxide Ba(Oi-Pr)₂, triethoxyborane B(OEt)₃, zirconium propoxide Zr(OPr)₄, lanthanum propoxide La(OPr)₃, yttrium propoxide Yt(OPr)₃ and lead isoproxide Pb(Oi-Pr)₂. These metal alkoxides are commercially available and can be easily obtained. A metal alkoxide is also commercially available in the form of a low condensation product, which is obtained through partial hydrolysis and also usable as a raw material.

Sol-Gel Method:

A sol-gel method refers to a process in which an organic metal compound is hydrolyzed to obtain a sol of an hydroxide, which is dehydrated to obtain a gel, and the gel is subjected to a heating treatment to prepare a metal oxide glass of a steady form (film form, particle form, fibrous form or the like). A poly-component metal oxide glass can also be obtained by a method of mixing different plural sol solutions or by addition of other metal ions.

Specifically, an inorganic oxide is produced preferably by a sol-gel method comprising the steps described below.

Namely, the sol-gel method comprises the steps of subjecting an organic metal compound to hydrolysis and dehydration condensation in the presence of a boron ion in a reaction solution containing at least water and an organic solvent with controlling the pH at 4.5 to 5.0 to obtain a reaction product, and heating the reaction product at a temperature of not more than 200° C. to perform vitrification. Such a method is specifically preferred in which generation of micropores or deterioration of membrane by a high temperature treatment is not caused.

In the foregoing sol-gel method, an organic metal compound used as a raw material may be any one which is capable of being hydrolyzed, and is not specifically limited, but a metal alkoxide, as described earlier is cited as a preferable organic metal compound.

In the sol-gel method, the foregoing organic metal compound may be used in the reaction without any change, but it is preferred to dilute the reaction mixture with a solvent to make it easier to control the reaction. Such a solvent used for dilution may be any one which is capable of dissolving the organic metal compound and being homogeneously miscible with water. Examples of such a solvent include aliphatic lower alcohols such as methanol, ethanol, propanol, isopropanol, butanol, isobutanol, ethylene glycol, propylene glycol and their mixtures. There are also usable a mixed solvent of butanol, cellosolve and butyl cellosolve, or a mixed solvent of xylol, cellosolve acetate, methyl isobutyl ketone and cyclohexane.

In cases when the foregoing organic metal compound is comprised of a metal of Ca, Mg or Al, such a metal often reacts with water in a reaction solution to form an hydroxide or forms a carbonate salt in the presence of carbonate ions ($CO_3^{2-}$), so that it is preferable to add an alcoholic solution of triethanolamine as a masking agent to the reaction solution. The organic metal compound is dissolved in a mixed solvent, preferably at a concentration of not more than 70% by mass, and is also diluted preferably to a range of 5 to 70% by mass when it is used.

A reaction solution used in the sol-gel method contains at least water and an organic solvent. Such an organic solvent may be any one which is capable of forming a homogeneous solution with water, an acid or a base, and preferable examples thereof includes lower aliphatic alcohols or the like which are usually used for dilution of the foregoing organic metal compound. Of the foregoing lower aliphatic alcohols, propanol, isopropanol, butanol or isobutanol is preferable rather than methanol or ethanol. This is due to the fact that growth of formed metal oxide glass film is stable. In the foregoing reaction solution, water is contained preferably at a concentration of 0.2 to 50 mol/L.

In the sol-gel method, an organic metal compound is hydrolyzed with using a halogen ion as a catalyst in the presence of a boron ion in the foregoing reaction solution. There is cited a trialkoxyboran $B(OR)_3$, as a suitable example of a compound giving rise to the foregoing boron ion. Specifically, triethoxyboran $B(OEt)_3$ is preferred. Further, the $B^{3+}$ ion concentration in the foregoing reaction solution is preferably within the range of 1.0 to 10.0 mol/L.

Preferable examples of a halogen ion include a fluorine ion and/or a chlorine ion. Namely, such a fluorine ion and a chlorine ion may be single or a mixture of them. There is usable any compound which gives rise to a fluorine ion and/or a chlorine ion in the foregoing reaction solution. For example, ammonium hydrogendifluoride $NH_4HF.HF$ and sodium fluoride $NaF$ are cited as a preferable fluorine source, and ammonium chloride $NH_4Cl$ is cited as a chlorine source.

The halogen ion concentration of halogen ions in the foregoing reaction solution is varied depending on the thickness of film formed of an inorganic composition having an inorganic matrix to be produced, but is usually from 0.001 to 2 mol/kg, and preferably from 0.002 to 0.3 mol/kg, based on the total mass of the foregoing reaction solution containing a catalyst. A halogen ion concentration of less than 0.001 mol/kg renders it difficult to allow hydrolysis of an organic metal compound to sufficiently proceed, making it difficult to form a film. On the other hand, when a halogen ion concentration exceeds 2 mol/kg, the formed inorganic matrix (metal oxide glass) tends to become non-uniform. Therefore, both cases are not preferable.

With respect to boron used at the time of the reaction, when contained as a $B_2O_3$ component in the designed composition of the obtained inorganic matrix, an organic boron compound is added in a calculated amount in accordance with the content of the product. When intended to remove boron, the formed film is heated in the presence of or with being dipped in methanol as a solvent and the boron is removed in the form of a boron methyl ester.

In the process of being subjecting the foregoing organic metal compound to hydrolysis and dehydration condensation to obtain a reaction product, a main reagent solution in which a given amount of the foregoing organic metal compound was dissolved in a mixed solvent containing prescribed amounts of water and an organic solvent, and a reaction solution containing a prescribed amount of the foregoing halogen ion were mixed at a given ratio and sufficiently stirred to form a homogeneous reaction solution; then, the reaction solution was adjusted to a prescribed pH value and ripened for a few hours to obtain the reaction product. A given amount of the foregoing boron compound was previously dissolved in the main reagent solution or in the reaction solution. When using an alkoxyborane, it is advantageous to dissolve it in the main solvent together with other organic metal compounds.

The pH value of the foregoing reaction solution is chosen according to the object. When it is intended to form a membrane (film) composed of the inorganic composition containing an inorganic matrix (metal oxide glass), it is preferred to control the pH to a range of 4.5 to 5 by using an acid such as hydrochloric acid or the like. In that case, it is useful to use, as an indicator, a mixture of Methyl Red and Bromocresol Green.

In the sol-gel method described earlier, a main reagent solution containing the same components at the same concentrations and the reaction solution (containing $B^{3+}$ and a halogen ion) are sequentially added supplementally at the same proportion with controlling the pH to the prescribed value, whereby the reaction product can be simply, and continuously produced. The concentration of the reaction solution described above, the concentration of water (containing an acid or alkali), and the halogen ion concentration are variable within ranges of ±50%, ±30%, and ±30%, respectively.

Then, the reaction product obtained in the preceding process (reaction solution after ripening) is heated at a temperature of not more than 200° C. to be vitrified. During heating, it is preferred that the temperature is carefully and gradually increased specifically within the range of 50 to 70° C. and after passing through the stage of pre-drying (solvent volatilization), the temperature is further raised. Such drying is important to form a nonporous film in cases when forming film. After the stage of pre-drying, drying by heating is conducted preferably at a temperature of 70 to 150° C., and more preferably 80 to 130° C.

Polysilaxane Method:

When the foregoing ceramic precursor contains a polysilazane, it is preferred that the resin substrate is coated with a solution containing a polysilazane represented by the following formula (1) and a catalyst as needed in an organic solvent; then, evaporation of the solvent leaves a 0.05 to 3.0 μm thick polysialzane layer, which is locally heated in the presence of oxygen and active oxygen, and nitrogen as needed in an atmosphere containing water vapor to form a glass-like transparent film on the resin substrate:

$$—(SiR_1R_2—NR_3)_n—$$ Formula (1)

wherein $R_1$, $R_2$ and $R_3$, which may be the same or different, are each independently hydrogen, an alkyl group, an aryl group, a vinyl group or (trialkoxysilyl)alkyl group, which may be substituted, and preferably are groups selected from the group of hydrogen, methyl, ethyl, propyl, iso-propyl, butyl, iso-butyl, tert-butyl, phenyl, vinyl, 3-(triethoxysilyl) propyl and 3-(trimethoxysilyl)propyl; and n is an integer, provided that n is defined so that said polysilazane has a number average molecular weight of 150 to 150,000 g/mol.

A basic catalyst is preferably used as a catalyst. Specifically, there is preferably used N,N-dimethylethanolamine, N,N-diethylethanolamine, triethanolamine, triethylamine, 3-morpholinopropylamine or N-heterocyclic compound. Such a catalyst is used usually at a concentration of 0.1 to 10 mol %, and preferably 0.5 to 7 mol %.

In one preferred embodiment of the present invention, there is used a solution containing perhydropolysilazane in which all of $R_1$, $R_2$ and $R_3$ are hydrogen atoms.

In another preferred embodiment, a coating by the present invention contains at least a polysilazane represented by the following formula (III):

$$-(SiR_1R_2-NR_3)_n-(SiR_4R_5-NR_6)_p-$$    Formula (III)

wherein $R_1$, $R_2$, $R_3$, $R_4$, $R_5$ and $R_6$ are independently hydrogen, an alkyl group, an aryl group, a vinyl group, or a (trialkoxysilyl)alkyl group; n and p are each an integer, and n is defined so that said polysilazane has a number average molecular weight of 150 to 150,000 g/mol.

A compound in which $R_1$, $R_3$ and $R_3$ are each a hydrogen and $R_2$, $R_4$ and $R_6$ are each methyl, a compound in which $R_1$, $R_3$ and $R_3$ are each a hydrogen, $R_2$ and $R_4$ are methyl, and $R_5$ is vinyl, and a compound in which $R_1$, $R_3$, $R_4$ and $R_6$ are each hydrogen, and $R_2$ and $R_5$ are each methyl, are specifically preferred.

Further, a solution containing a polysilazane represented by the following formula (IV) is also preferable:

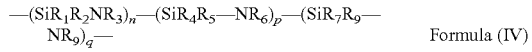
$$-(SiR_1R_2NR_3)_n-(SiR_4R_5-NR_6)_p-(SiR_7R_9-NR_9)_q-$$    Formula (IV)

wherein $R_1$, $R_2$, $R_3$, $R_4$, $R_5$, $R_6$, $R_7$, $R_8$, and $R_9$ are each hydrogen, an alkyl group, an aryl group, a vinyl group or an (alkoxysilyl)alkyl group, which may be substituted; n, p and q are each an integer, provided that n is defined so that said polysiloxane exhibits a number average molecular weight of 150 to 150,000 g/mol.

Specifically, a compound in which $R_1$, $R_3$ and $R_6$ is (triethoxy)propyl and $R_7$ is an alkyl group or hydrogen, is preferred.

The proportion of a polysilozane in a solvent is generally from 1 to 80% by mass, preferably from 5 to 50% by mass and more preferably from 10 to 40% by mass.

A solvent preferably is an organic one which does not contain water and a reactive group (for example, a hydroxyl group or amine group) and is inert to polysilazane, and more preferably, a non-protonic one. Examples thereof include an aliphatic or non-aliphatic hydrocarbon, a halogenated hydrocarbon, an ester, such as ethyl acetate or butyl acetate, a ketone such as acetone or methyl ethyl ketone, an ether such as tetrahydrofuran or Dibutyl ether, mono- or poly-alkylene glycol dialkyl ether (diglymes) and a mixture of these.

Further supplement components added to the foregoing polysilazane include a binder such as used in conventional paints. Specific examples of a binder include a cellulose ether and a cellulose ester such as ethyl cellulose, nitrocellulose, cellulose acetate, cellulose acetobutylate, a natural resin such as rubber or rosin resin, and a synthetic resin, for example, a polymer resin or condensation resin, such as aminoplast, specifically, urea resin or melamine formaldehyde resin, alkyd resin, acryl resin, polyester or modified polyester, epoxide, polyisocyanate or blocked polyisocyanate, or polysiloxane.

Other components of said polysiloxane mixture include, for example, additives affecting viscosity, wettability of a substrate, film forming property, lubricating action or exhaust, such as $SiO_2$, $TiO_2$, $ZnO$, $ZrO_2$ and $Al_2O_3$.

Application of the method of the present invention makes it possible to prepare a close glassy film which has no crack or pore and exhibits enhanced barrier action to gas.

The thickness of the thus formed film is preferably within the range of 10 nm to 2 μm.

Outermost Layer:

In the invention, the outermost layer of the film mirror is an antistatic hard-coat layer, characterized in that the antistatic property has an electric surface resistivity value of $1.0 \times 10^{-3}$ to $1.1 \times 10^9$ ohms per square, a pencil hardness of not less than H and less than 6H, and not more than 30 scratches in a steel wool test under a load of 500 g/cm$^2$ is not more than 30, and the pencil hardness is preferably not less than 2H and less than 6H to achieve high reflectance even when washed with a brush after outdoor exposure.

Methods of preparing a layer exhibiting enhanced hardness and applicable to the outermost surface of a film mirror include, for example, a method of using a resin of high hardness, a method of employing an inorganic film, a method of curing a resin by heating or exposure to ultraviolet rays, and a method of allowing inorganic particles modified with olefinic side chains to be contained in a resin and curing the resin by heating or exposure to ultraviolet rays.

Antistatic techniques include, for example, a method of dispersing a conductive filler to reduce the electric resistance value, a method of using a conductive polymer, a method of dispersing or surface-coating a metal compound, an internal addition method of employing an anionic compound such as an organic sulfonic acid or an organic phosphoric acid, a method of using a surfactant type, low-molecular antistatic agent, such as polyoxyethylene alkyleneamine, polyoxyethylene alkenylamine, glycerin fatty acid ester, and a method of dispersing a conductive filler such as carbon black.

As a conductive filler are cited metal particles and conductive inorganic oxide particles. Examples of such metal particles include gold, silver, palladium, ruthenium, rhodium, osmium, iridium, tin, antimony, and indium.

Examples of particulate inorganic oxide include indium antimony pentaoxide, tin oxide, zinc oxide, ITO (indium tin oxide), ATO (antimony oxide) and phosphorus-doped oxide. Of these, inorganic double oxide particles are preferred which exhibit high conductivity and transparency and also result in high hairiness of the outermost layer.

Inorganic Double Oxide Particle:

Examples of the foregoing particulate inorganic double oxide include ITO (indium tin oxide), ATO (antimony tin oxide), double oxide of antimony pentaoxide/zinc oxide and phosphorus-doped tin oxide.

First, film resistance is classified mainly into particle internal resistance and contact resistance. The particle internal resistance is affected by the doping amount of a foreign metal, deficient amount of oxygen and crystallinity. Contact resistance is affected by particle size or shape, dispersibility of particles in paint and conductivity of a binder resin. Since a film exhibiting relatively high conductivity is supposed to be largely affected by contact resistance rather than by internal resistance, it is important to form an electric conduction path by controlling the particle state.

To prevent lowering of transparency of the outermost layer when dispersing a conductive filler, the primary particle size is preferably from 1 to 100 nm, and more preferably 1 to 50 nm. To allow particles to come close to each other to achieve conductivity, the particle size is preferably not less than 1 nm. Particle sizes exceeding 100 nm results in reflection of light, leading to lowering of transmittance.

Examples of a conductive polymer include polyacetylene, poly-p-phenylene, polyaniline, polythiophene, poly(p-phenylen-vinylene), and polypyrrole.

Both hard-coat property and conductivity can be achieved by application of techniques in the foregoing hard-coat component and the foregoing conductive materials (as described in Patent document 2).

A technique for forming the outermost layer can employ commonly known coating methods such as a gravure coating method, a reverse coating method, and a die coating method. The outermost layer can also be formed by a vacuum film-forming method, such as a resistance heating vacuum deposition method, an electron beam heating vacuum deposition method, an ion plating method, an ion beam-assisted vacuum deposition method and a sputtering method.

The foregoing outermost layer preferably is flexible and causes no warping. The outermost layer sometimes forms a close cross-linking structure, there are caused cases in which a film is warped or cracked without being bent, rendering it difficult to handle the film. In that case, it is preferred to design the outermost layer by controlling the inorganic material content of the composition so that the outermost layer remains flexible and flat.

Pencil Hardness:

Measurements were conducted in accordance with the standard of JIS K 5600. Specifically, a scratch test of the surface of the individual film mirror samples was conducted, while maintaining a pencil at an angle of 45 degrees with applying a load of 500 g thereto. The hardness was ranked with a hardness mark of a pencil which caused no scratches in at least four out of five times.

Steel Wool Test:

A steel wool test is a method in which, using #0000 steel wool, the functional layer surface of a sample is rubbed back and forth with the steel wool cut to 1 cm$^2$ a prescribed number of 100 mm strokes and at a rate of 30 mm/sec, while applying a load of 500 g onto the steel wool.

Electric Resistance Value:

Measurements were conducted in accordance with the standard of JIS K 7194, wherein, after being allowed to stand in an atmosphere of 50% r.h. and a temperature of 50° C., a sample was measured at five points within a probe (ASP Probe, made by Mitsubishi Kagaku Co., Ltd.) in which probe needles were linearly arranged linearly at regular intervals of 5 mm. An average value of five points was defined as the electric resistance value.

There is preferred an embodiment in which the contact angle of the outermost layer is not less than 0° and not more than 70°, and the pencil hardness is not less than 1H and not more than 6H. Further, an embodiment in which the contact angle of water of the outermost layer is not less than 0° and not more than 50°, and the pencil hardness is not less than 1H and not more than 6H, is also preferred; and is also preferred an embodiment in which the contact angle of water of the outermost layer is not less than 0° and not more than 30°, and the pencil hardness is not less than 1H and not more than 6H.

In a preferred embodiment, a gas barrier layer of which hydrophilicity is controlled is used as the outermost layer. Thereby, since the outermost layer is provided with gas barrier capability, it is not necessary to provide a gas barrier layer.

There will be further described a hydrophilic outermost layer.

Methods of forming a hydrophilic layer include, for example, a method of allowing hydroxide groups to orient on the surface and a method of forming fine shapes on the surface. Examples of a method of allowing hydroxide groups to orient include a method of adding a compound containing a hydroxyl group as a side chain to a film, a method of coating a solution capable of replacing functional groups existing on the surface by hydroxyl groups, and a method of performing a surface treatment or a microfabrication treatment.

Examples of a material used for the outermost layer include a photo-curable hydrophilic acryl resin film (JP 07-048148 A), an acrylate resin composition, an acryl resin containing aqueous colloidal silica (JP 2005-066824 A), a polyurethane resin composition (JP 2005-110918 A), a resin film using an aqueous silicone compound as a binder (JP 2004-142161 A), a silica film containing a photocatalytic oxide such as titanium oxide or a photocatalyst film of alumina, titanium oxide of high aspect ratio or niobium oxide (JP 2009-062216A), a photocatalyst-containing fluororesin coating (Pialex Technologies Co., Ltd.), organic/inorganic polysiloxane film, and an organic/inorganic polysiloxane film containing a hydrophilicity-accelerating agent (AZ Electronics Co., Ltd.).

Further, hydrophilicity may be promoted by a surface treatment. Examples thereof include a corona treatment (JP 11-172028 A), a plasma treatment, an ultraviolet/ozone treatment, surface protrusion formation (JP 2000-226613 A) and a surface microfabrication treatment.

Contact Angle Test:

Water of 3 µL was dropped onto the surface of a film mirror and the contact angle was measured by using a contact angle meter (DM 300, produced by Kyowa Kaimen Kagaku Co., Ltd.), based on JIS R 3257.

Silver Reflection Layer:

A method of the silver reflection layer related to the present invention may employ both a wet process and a dry process.

A wet process is the general name for plating methods, in which a metal is deposited from solution to form a membrane. Specific example include a silver mirror reaction.

On the other hand, a dry process is the general name for vacuum film forming methods and specific examples include a resistance heating vacuum vapor deposition method, an electron beam heating vacuum vapor deposition method, an ion plating method, an ion-beam-assisted vacuum deposition method and a sputtering method. Specifically, in the present invention, there is preferably employed a vapor deposition method in which a roll-to-roll system for continuous film formation is feasible. Namely, the method of producing the film mirror of the present invention preferably is a production method including a step of forming the said silver reflection layer by silver vapor deposition.

The thickness of the said silver reflection layer is preferably from 10 to 200 nm in terms of reflectance, and more preferably from 30 to 150 nm.

In the present invention, the silver reflection layer may be placed on the light-incident side to the support or on the opposite side, but is placed preferably on the light incident side in view of the support being a resin and also for the purpose of preventing the resin from deterioration by light beams.

Resin Substrate:

The resin substrate related to the present invention can employ various resin films known in the art. Examples thereof include a cellulose ester film, polyester film, polycarbonate film, polyarylate film, polysulfone (including polyether sulfone) film, polyester film such as polyethylene terephthalate or polyethylene naphthalate, polyethylene film, polypropylene film, cellophane, cellulose diacetate film, cellulose triacetate film, cellulose acetate propionate film, cellulose acetate butyrate film, polyvinylidene chloride film, polyvinyl alcohol film, ethylene vinyl alcohol film, syndiotactic polystyrene film, polycarbonate film, norbornene resin film, polymethylpentene film, polyether ketone film, poly(ether ketone imide) film, polyamide film, fluororesin film, nylon film, poly(methyl methacrylate) film, and polyacrylate film. Of these, a polycarbonate film, polyester film, norbornene film and cellulose ester film are preferred.

It is specifically preferred to use a polyester film or cellulose ester film, which may be a film produced by melt cascade casting or a film produced by solution casting.

The thickness of a resin substrate is suitably chosen, depending on the kind or object of a resin. For instance, the thickness is generally within a range of 10 to 300 μm, preferably 20 to 200 μm, and more preferably 30 to 100 μm.

Adhesive Layer:

The foregoing adhesive layer may be any one having a function of enhancing adhesion between the silver reflection layer or the metal layer and the resin substrate, which is not specifically restricted. Accordingly, the said adhesive layer requires adhesiveness to allow the metal reflection layer to adhere to the resin substrate (resin film), heat resistance capable of being resistant to heat at the time when forming a metal reflection layer by vacuum deposition and smoothness to bring about high reflection performance which the metal reflection layer inherently exhibits.

The thickness of the adhesive layer is preferably from 0.01 to 3 μm in terms of adhesiveness, smoothness and reflectance of a reflection material, more preferably from 0.1 to 1 μm.

In cases when the adhesive layer is a resin, any resin which satisfies the foregoing adhesiveness, heat resistance and smoothness is usable as a binder for the adhesive layer and includes, for example, a polyester resin, an acrylic resin, a melamine resin, an epoxy resin, polyamide resin, a vinyl chloride resin, and a copolymer resin of vinyl chloride and vinyl acetate, which may be used singly or in combination. Of these, a mixture resin of a polyester resin and a melamine resin is preferred in terms of weather resistance, and a heat-setting type resin in which a curing agent such as an isocyanate or the like is contained is more preferred. Formation of an adhesive layer is conducted by conventional methods known in the art, such as a gravure coat method, a reverse coat method, or a die coat method.

In cases when an adhesive layer is a metal oxide, the adhesive layer can be formed through various vacuum film forming methods by using metal oxides such as silicon oxide, aluminum oxide, silicon nitride, aluminum nitride, lanthanum oxide and lanthanum nitride. Examples of such film forming methods include a resistance heating vacuum deposition method, an electron beam heating vacuum deposition method, an ion plating method, an ion beam-assisted vacuum deposition method and a sputtering method.

Corrosion Proof Layer:

The corrosion proof layer is provided preferably adjacent to the silver reflection layer and contains a corrosion inhibitor. Corrosion inhibitors are mainly classified to a corrosion inhibitor containing an adsorptive group to silver and a corrosion inhibitor exhibiting anti-oxydizing capability (which is also called an antioxidant).

Herein, "corrosion" refers to a phenomenon in which a metal (or silver) is chemically or electrochemically eroded or materially deteriorated (refer to JIS Z0130-2004).

In one of the preferred embodiments of the film mirror used for solar power generation, the foregoing adhesive layer contains a corrosion inhibitor which is adsorptive to silver or an antioxidant.

The content of a corrosion inhibitor, which depends on a compound to be used, is preferably within a range of 0.1 to 1.0 g/m$^2$.

Silver-Adsorptive Corrosion Inhibitor

A corrosion inhibitor exhibiting absorptivity to silver (which is hereinafter also denoted as a silver-adsorptive corrosion inhibitor) is preferably selected from amines and their derivatives, a compound containing a pyrrole ring, a compound containing a triazole ring, a compound containing a pyrazole ring, a compound containing an imidazole ring, a compound containing an indazole ring, a copper chelate compound, thioureas, a compound containing a mercapto group and naphthalene type compounds, which are used singly or in their combination.

Examples of amines and their derivatives include ethylamine, laurylamine, tri(n-butyl)amine, o-toluidine, diphenylamine, ethylenediamine, diethylenetriamine, triethylenetetramine, tetraethylenepentamine, monoethanolamine, diethanolamine, triethanolamine, 2N-dimethylethanolamine, 2-amino-2-methyl-1,3-propanediol, acetoamide, acylamide, benzamide, p-ethoxy-Chrysoidine, dicyclohexylammonium nitrite, dicyclohexylammonium salicyrate, monoethanolamine benzoate, dicyclohexylammonium benzoate, diisopropylammonium benzoate, diisopropylammoniumnitrite, cyclohexylamine carbamate, nitronaphthalene ammonium nitrite, cyclohexylamine benzoate, dicylohexylammonium cyclohexanecarboxylate, cyclohexylamine cyclohexanecarboxylate, dicyclohexylammonium acrylate, cyclohexylamine acrylate and a mixture of these amine compounds.

Examples of a compound containing a pyrrole ring include N-butyl-2,5-dimethylpyrrole, N-phenyl-2,5-dimethylpyrrole, N-phenyl-3-formyl-2,5-dimethylpyrrole, N-phenyl-3,4-diformyl-2,5-dimethylpyrrole, and a mixture of those pyrrole compounds.

Examples of a compound containing a triazole ring include 1,2,3-triazole, 1,2,4-triazole, 3-mercapto-1,2,4-triazole, 3-hydroxy-1,2,4-triazole, 3-methyl-1,2,4-triazole, 1-methyl-1,2,4-triazole, 1-methyl-3-mercapto-1,2,4-triazole, 4-methyl-1,2,3-triazole, benzotriazole, tolytriazole, 1-hydroxybenzotriazole, 4,5,6,7-tetrahydrothiazole, 3-amino-1,2,4-triazole, 3-amino-5-methyl-1,2,4-triazole, carboxybenzotriazole, 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-4-octoxyphenyl)benzotriazole and a mixture of those triazole compounds.

Examples of a compound containing a pyrazole ring include pyrazole, pyrazoline, pyrazolone, pyrazolidine, pyrazolidone, 3,5-dimethylpyrazole, 3-methyl-5-hydroxypyrazole, 4-aminopyrazole, and a mixture of those compounds.

Examples of a compound containing a thiazole ring include thiazole, thiazoline, thiazolone, thiazolidine, thiazolidine, isothiazole, benzothiazole, 2-N,N'-diethylthiobenzothiazole, p-dimethylaminobenzalrhodanine, 2-mercaptobenzothiazole, and a mixture of those compounds.

Examples of a compound containing an imidazole ring include imidazole, histidine, 2-heptadecylimidazole, 2-methylimidazole, 2-ethyl-4-methylimidazole, 2-phenylimidazole, 2-undecylimidazole, 1-benzyl-2-methylimidazole, 2-phenyl-4-methylimidazole, 1-cyanoethyl-2-methylimidazole, 1-cyanoethyl-2-phenylimidazole, 1-cyanoethyl-2-ethyl-4-methylimidazole, 1-cyanoethyl-2-undecylimidazole, 2-phenyl-4-methyl-5-hydromethylimidazole, 2-phenyl-4,5- dihydroymethylimidazole, 4-formylimidazole, 2-methyl-4-formylimidazole, 2-phenyl-4-formylimidazole, 4-methyl-5-formylimidazole, 2-ethyl-4-methyl-5-formylimidazole, 2-phenyl-4-methyl-formylimidazole, 2-mercaptobenzoimidazole and a mixture of those compounds.

Examples of a compound containing an indazole ring include 4-chloroindazole, 4-nitroindazole, 5-nitroindazole, 4-chloro5-nitroindazole, and a mixture of those compounds.

Examples of a copper chelate compound include copper acetylacetone, copper ethylenediamine, copper phthalocyanine, copper ethylenediamine tetraacetate, copper hydroxyquinoline, and a mixture of those compounds.

Examples of thioureas include thiourea, guanylthiourea and a mixture of these compounds.

Examples of a compound containing a mercapto group include mercaptoacetic acid, thiophenol, 1,2-ethanedithiol, 30mercapto-1,2,4-triazole, 1-methyl-3-mercapto-1,2,4-triazole, 2-mercaptobenzothiazole, 2-mercaptobenzoimidazole, glycol dimercaptoacetate, 3, mercaptopropyltrimethoxysilane and a mixture of those compounds.

Examples of a naphthalene type compounds include thionalide.

Antioxidant:

There can also be used an antioxidant, as a corrosion inhibitor for the silver reflection layer used in the film mirror of the invention.

It is preferred to use, as an antioxidant, a phenol type antioxidant, a thiol type antioxidant and a phosphite type antioxidant.

Examples of a phenol type antioxidant include 1,1,3-tris (2-methyl-4-hydroxy-5-t-butylphenyl)butane, 2,2'-methylenebis(4-ethyl-6-t-butylphenol), tetrakis-[methylene-3-(3', 5'-di-t-butyl-4'-hydroxyphenyl)propionate]methane, 2,6-di-t-butyl-p-cresol, 4,4'-thiobis(3-methyl-6-t-butylphenol), 4,4'-butylidenebis(3-methyl-6-t-butylphenol), 1,3,5-tris(3', 5'-di-t-butyl-4'-hydroxybenzyl)-S-triazine-2,4,6-(1H,3H, 5H)trione, stearyl-β-(3,5-di-t-butyl-4-hydroxyphenyl)propionate, triethylene glycol bis[3-(3-t-butyl-5-methyl^4-hydroxyphenyl)propionate], 3,9-bis{1,1-di-methyl-2-[β-(3-t-butyl-4-hydroxy-5-methylphenyl)propionyloxy]ethyl}-2, 4,8,10-tetraoxioxaspiro[5,5]undecane, and 1,3,5-trimethyl-2,4,6-tris(3,5-di-t-butyl-4-hydroxybenzyl)benzene. A phenol type antioxidant having a molecular weight of not less than 550 is specifically preferred.

Examples of a thiol type antioxidant include distearyl-3, 3'-thiodipropionate, and pentaerythritol-tetrakis-(β-laurylthiopropionate).

Examples of a phosphite type antioxidant tris(2,4-di-t-butylphenyl)phosphate, distearylpentaeiythritol diphosphite, di(2,6-di-t-butylphenyl)pentaerythritol diphosphite, bis-(2, 6-di-t-butyl-4-methylphenyl)-pentaerythritol diphosphite, tetrakis(2,4-di-t-butylphenyl)-4,4-biphenylene-diphosphonate, and 2,2'-methylenebis(4,6-di-t-butylphenyl)octylphosphite.

In the present invention, there may be used the foregoing antioxidant and a light stabilizer described below in combination.

Examples of a hindered amine type light stabilizer include bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-(3,5-di-t-butyl-4-hydroxybenzyl)-2-n-butylmalonate, 1-methyl-8-(1,2,2,6,6-pentamethyl-4-piperidyl)sebacate, 1-{2-[3^(3,5-di-t-butyl-4-hydroxyphenyl)propionyloxy]ethyl}-4-[3-(3,5^di-t-butyl-4-hydroxyphenyl)propionyloxy]2,2,6,6-tetramethylpiperidine, 4-benzoyloxy-2,2,6,6-tetramethylpiperidine, tetrakis(2,2,6,6-tetramethyl-4-piperidyl)-1,2,3,4-butane-tetracarboxylate, triethylenediamine, and 8-acetyl-3-dodecyl-7,7,9,9-tetramethyl-1,3,8-triazaspiro[4,5]decane-2,4-dione.

Of hindered amine type light stabilizers, one which contains only a tertiary amine, is preferred and specific examples thereof include bis(1,2,2,6,6-pentamethyl-4-piperidyl)-sebacate, bis(1,2,2,6,6-pentamethyl-4-piperidyl)-2-(3,5-di-t-butyl-4-hydroxybenzyl)-2-n-butylmalonate. Further, a condensate of 1,2,2,6,6-pentamethyl-4-piperidinol/tridecylalcohol and 1,2,3,4-butanetetracarboxylic acid is also preferred.

Further, there is also usable a nickel type ultraviolet stabilizer such as [2,2'-thiobis(4-t-octylphenolate)]-2-ethylhexylamine nickel (11), nickel complex-3,5-di-t-butyl-4-hydroxybenzyl.phosphoric acid monoethylate, or nickel-dibutyl-dithiocarbamate.

Metal Layer:

In the invention, a metal layer employing a metal exhibiting an ionization tendency higher than silver may be provided adjacent to silver. Examples of such a metal include lithium, cesium, rubidium, potassium, barium, strontium, calcium, sodium, magnesium, aluminum, manganese, Tantalus, zinc, chromium, iron, cadmium, cobalt, nickel, tin, lead, antimony, bismuth, copper and mercury. Of these, aluminum, zinc, iron, tin and copper are preferred.

The metal layer may be formed by a wet process which is generally called a plating method or by a vacuum film forming method as described earlier, but the vacuum film forming method is preferably used.

Taking into account sacrificial anticorrosion function for silver, the thickness of the metal layer is within a range of 10 μm to 500 μm, preferably 50 to 300 μm, and more preferably 100 to 200 μm.

Ultraviolet Absorber:

In the invention, an ultraviolet absorber (hereinafter, also denoted as a UV absorber) may be added for the purpose of prevention of deterioration by sun light or ultraviolet rays. Preferably, at least one of constituent layers provided on the resin substrate contains an ultraviolet absorber or an ultraviolet absorber layer is provided on the surface side of the corrosion proof layer.

Ultraviolet absorbers include benzophenone type, benzotriazole type, phenyl salicylate type and triazine type ones.

Specific examples of a benzophenone type ultraviolet absorber include 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'^dihydroxy-4-methoxy-benzophenone, 2,2'-dihydroxy-4,4'-dimethoxy-benzophenone, and 2,2',4,4'-tetrahydroxy-benzophenone.

Specific examples of a benzotriazole type ultraviolet absorber include 2-(2'-hydroxy-5-methylphenyl)benzotriazole, 2-(2'-hydroxy-3',5'-di-t-butylphenyl)benzotriazole, and 2-(2'-hydroxy-3'-t-butyl-5'-methylphenyl)benzotriazole.

Specific examples of a phenyl salicylate type ultraviolet absorber include phenyl salicylate, and 2-4-t-butylphenyl-3, 5-di-t-butyl-4-hydroxybenzoate. Specific examples of a hindered amine type ultraviolet absorber include bis(2,2,6,6-tetramethylpiperidine-4-yl)sebacate.

Specific examples of a triazine type ultraviolet absorber include 2,4-diphenyl-6-(2-hydroxy-4-methoxyphenyl)-1,3, 5-triazine, 2,4-diphenyl-6-(2-hydroxy-4-ethoxyphenyl)-1,3, 5-triazine, 2,4-diphenyl-(2-hydroxy-4-propoxyphenyl)-1,3, 5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3, 5-triazine, 2,4-diphenyl-6-(2-hydroxy-4-octyloxyphenyl)-1, 3,5-triazine, 2,4-diphenyl-6-(2-hydroxy-4- dodecyloxyphenyl)-1,3,5-triazine, and 2,4-diphenyl-6-(2-hydroxy-4-benzyloxyphenyl)-1,3,5-triazine.

Besides the forgoing ultraviolet absorbers, a compound having a function of transforming an energy retained by an ultraviolet ray into a vibration energy within a molecule and liberating the vibration energy in the form of heat energy. There is cited an ultraviolet absorber which comes into effect in combined use with an antioxidant or there may be concurrently used a colorant and a light stabilizer which is called a quencher and acts in such a manner as a light energy converting agent. When using an ultraviolet absorber, as described above, it is necessary to choose an ultraviolet absorber whose light absorption wavelength does not overlap with the effective wavelength of a photopolymerization initiator.

When using conventional ultraviolet inhibitors, it is effective to use a photopolymerization initiator capable of generating a radical upon exposure to light.

An ultraviolet absorber is used preferably in an amount of from 0.1 to 20% by mass, more preferably from 1 to 15% by mass, and still more preferably from 3 to 10% by mass. An amount of more than 20% by mass results in deteriorated adhesion property and an amount of less than 0.1% by mass leads to reduced improvement effect in weather resistance.

Total Thickness of Film Mirror

The total thickness of the film mirror related to the present invention is preferably from 75 to 250 µm, more preferably from 90 to 230 µm, and still more preferably from 100 to 220 nm in terms of prevention of deflection, specular reflectance and handling characteristics of the mirror.

EXAMPLES

In the following, the present invention will be specifically described with reference to FIG. 1 and using Examples and Comparison Examples.

Example 1

Preparation of Film Mirror 1

As shown in FIG. 1a, an acryl resin film (ACRYPLEN HBS 006, 75 µm thickness, made by Mitsubishi Rayon Co., Ltd.) was used as a resin substrate 21. A mixture in which a polyester resin (POLYESTER SP-181, made by Nippon Gosei Kagaku Co., Ltd.) and TDI (tolylene diisocyanate) type isocyanate (Cosmonate TDI 100, made by Mitsui Takeda Chemical Co., Ltd.) were mixed in a solid ratio of 10:2, methyl ethyl ketone as a solvent was added thereto, and glycol dimercaptoacetate (made by Wako Junyaku Co., Ltd.) was further added in an amount of 0.05 g/m², was coated by a gravure coating method on one side of the acryl resin film to form a 100 nm thick corrosion proof layer (25). Subsequently, a silver reflection layer (22) was formed on the corrosion proof layer by vapor deposition so as to be 150 nm thick. Further, on the silver reflection layer was formed a 20 nm thick protective layer 24 of the same composition as the corrosion prooflayer.

Water was mixed with 100 parts by mass of a conductive polymer resin (Denatron P-502S, made by Nagase ChemteX Co., Ltd.), 400 parts by mass of a polyurethane resin (HM-200, made by HEPCE CHEM Co., Ltd.), 300 parts by mass of an epoxy curing agent (DENACOL EX-614, made by Nagase ChemteX Co., Ltd.), and 150 parts by mass of a tetrafluoroethylene as a fluororesin (Teflon, made by du Pont Co.) to prepare an antistatic coating solution. Then, an antistatic coating solution was prepared by adding 1.5 parts by mass of a fluorinated surfactant with a molecular weight of 3000 to 5000 (RS-75 DIC Co., Ltd.) to the foregoing coating solution so that the overall solid content was 2.0% by mass. The coating solution were coated by a gravure coating method on the opposite side of the resin substrate 21 to the side provided with the corrosion proof layer (25) to form an uppermost surface layer 23 (antistatic layer), whereby a film mirror 1 was obtained.

Preparation of Film Mirror 2

Film mirror 2 was prepared in a similar manner to preparation of the film mirror 1, provided that a mixed solution of 67% by mass of a methacryl resin (SUMIPEX, made by Sumitomo Kagaku Co., Ltd.), 3% by mass of amorphous silica (SNOWTEX, made by Nissan Kagaku Kogyo Co., Ltd.) and 1% by mass of a photoinitiator (Irg 184, made by BASF Japan Co., Ltd.) was coated by a bar coating method so as to form a 3 min thick dry film, followed by being preliminarily dried at 80° C. and further hardened by ultraviolet rays to form an outermost layer 23 (hard coat layer), whereby a film mirror 2 was obtained.

Preparation of Film Mirror 3

As shown in FIG. 1a, there was used a biaxially oriented polyester film [polyethylene terephthalate (PET) film, thickness of 100 µm] as the resin substrate (21). On one side of the biaxially oriented polyester film was coated a mixture in which a polyester resin (polyester SP-181, made by Nippon Gosei Kagaku Co., Ltd.) and TDI (tolylene diisocyanate) type isocyanate (Cosmonate TDI 100, made by Mitsui Takeda Chemical Co., Ltd.) were mixed in a solid ratio of 10:2, methyl ethyl ketone as a solvent was added thereto, and glycol dimercaptoacetate (made by Wako Junyaku Co., Ltd.) was further added in an amount of 0.05 g/m², was coated by a gravure coating method on one side of the acryl resin film to form a 100 nm thick corrosion proof layer (25). Subsequently, a silver reflection layer (22) was formed on the corrosion proof layer by vapor deposition so as to be 150 nm thick. Further, on the silver reflection layer was formed a 20 nm thick protective layer 24 of the same composition as the corrosion proof layer 25. Subsequently, 100 parts by mass of dipentaerythritol hexaacrylate (A-DPH, made by Nakamura Kagaku Kogyo Co., Ltd., solid content of 100%) was mixed with 300 parts by mass of phosphorus-doped tin colloid (CX-S300M, made by Nissan Kagaku Kogyo Co., Ltd., particle size of 20 nm, solid content of 30%) and 165 parts by mass of MEK and stirred. Further thereto was added 5 parts by mass of Irgacure 907 as an initiator to prepare a coating solution for an antistatic hard coat layer. The coating solution for an antistatic hard coat layer was coated on the opposite side of the biaxially oriented polyester film to the corrosion proof layer (25) and subjected to an ultraviolet treatment by an ultraviolet irradiation device to form an outermost layer 23 (antistatic hard coat layer), whereby a film mirror 3 was obtained.

Preparation of Film Mirror 4

A film mirror 4 was prepared in the same manner as the film mirror 3, except that an acryl resin film (ACRYLEN HBS 010P, made by Mitsubishi Rayon Co., Ltd., thickness of 75 µm) was used as the resin substrate (21).

Preparation of Film Mirror 5

In preparation of the film mirror 4, a gas barrier layer 26 was formed between the resin substrate and the corrosion proof layer, as shown in FIG. 1b. In the preparation process, An ether solution of 3% perhydropolysilazane (NL 120, made by Clariant Co.) was coated on the resin substrate by a bar coating method so that the film thickness after being dried was 100 nm, and spontaneously dried for 3 minutes and annealed in an oven at 70° C. over 30 minutes to form a gas barrier layer 27, then, a corrosion proof layer of the film mirror 3 was coated and dried. Other procedures were conducted similarly to the film mirror 3, whereby a sample of a film mirror 5 was obtained.

Preparation of Film Mirror 6

A film mirror 6 was obtained in the same manner as the foregoing film mirror 5, except that 450 parts by mass of a colloidal composite oxide of antimony pentoxide/zinc oxide (CX-Z 210 IP-F2, made by Nissan Kagaku Kogyo Co., particle size of 50 nm, solid content of 20%) was used in place of 300 parts by mass of phosphor-doped tin oxide colloid.

Preparation of Film Mirror 7

A film mirror 7 was prepared in the same manner as the film mirror 6, except that 2,2'-methylenebis-(4,6-di-t-butylphenyl)octylphosphite (antioxidant, made by Showa Kagaku Kogyo Co., Ltd.) was added in an amount of 0.01 g/m$^2$, in place of a corrosion inhibitor of glycol dimercaptoacetate (silver-adhesive corrosion inhibitor).

Preparation of Film Mirror 8

A film mirror 8 was prepared in the same manner as the film mirror 6, except that a 100 nm thick ultraviolet absorber layer 27 was provided between the resin substrate and the gas barrier layer, as shown in FIG. 1c. The ultraviolet absorber layer (27) was formed as follows. Methyl ethyl ketone was added to a resin mixture of a polyester resin (Polyester SP-181, made by Nippon Gosei Kagaku Co., Ltd.) and TDI (tolylene diisocyanate) type isocyanate (Cosmonate TDI 100, made by Mitsui Takeda Chemical Co., Ltd.) in a solid content ratio of 10:2, and benzotriazole (made by BASF Co.) as a UV absorber was further added to the resin mixture in an amount of 0.01 g/m$^2$. The thus prepared resin mixture was coated by a gravure coating method to form the ultraviolet absorber layer (27).

Preparation of Film Mirror 9

A film mirror 9 was prepared in the same manner as the film mirror 8, except that the acryl resin film (ACRYPLEN HBS 010P, made by Mitsubishi Rayon Co., Ltd., thickness of 75 µm) was replaced by an acryl resin film (ACRYPLEN HBS 010P, made by Mitsubishi Rayon Co., Ltd., thickness of 125 µm).

Preparation of Film Mirror 10

Preparation of Film Mirror 10

A film mirror 10 was prepared in the same manner as the film mirror 3, except that 300 parts by mass of phosphorus-doped tin colloid (CX-S 300M, made by Nissan Kagaku Kogyo Co., Ltd., particle size of 20 nm, solid content of 30%) was replaced by 100 parts by mass of a conductive polymer (ORMECON, made by Nissan Kagaku Kogyo Co., Ltd, high-conductive polyaniline type, dispersed in organic solvent).

Preparation of Film Mirror 11

A film mirror 11 was prepared in the same manner as the film mirror 3, except that the outermost layer 23 (antistatic hard coat layer) was provided on the protective layer 24 in place of providing it on the opposite side of the biaxially oriented polyester film to the corrosion proof layer (25).

Preparation of Film Mirror 12

A film mirror 12 was prepared in the same manner as the film mirror 11, except that a gas barrier layer 26 used in the film mirror 5 was provided between the protective layer 24 and the outmost surface layer 23, as shown in FIG. 2b.

Preparation of Film Mirror 13

A film mirror 13 was prepared in the same manner as the film mirror 12, except that 450 parts by mass of a double oxide of antimony pentaoxide/zinc oxide (CX-Z 210 JP-F2, made by Nissan Kagaku Kogyo Co., Ltd., particle size of 50 nm, solid content of 20%) was used in place of 300 parts by mass of phosphorus-doped tin colloid.

Preparation of Film Mirror 14

A film mirror 14 was prepared in the same manner as the film mirror 13, except 0.01 g/m$^2$ of 2,2'-methylenebis(4,6-di-t-butylphenyl)octylphosphite (antioxidant, made by Showa Kagaku Kogyo Co., Ltd.) was used in place of 0.05 g/m$^2$ of a corrosion inhibitor of glycol dimercaptoacetate (made by WAKO Junyaku Co., Ltd.).

Preparation of Film Mirror 15

A film mirror 15 was prepared in the same manner as the film mirror 14, except that a 100 nm thick ultraviolet absorber layer 27 was provided between the resin substrate and the gas barrier layer, as shown in FIG. 2c. The ultraviolet absorber layer 27 was formed as follows. Methyl ethyl ketone was added to a resin mixture of a polyester resin (Polyester SP-181, made by Nippon Gosei Kagaku Co., Ltd.) and TDI (tolylene diisocyanate) type isocyanate (Cosmonate TDI 100, made by Mitsui Takeda Chemical Co., Ltd.) in a solid content ratio of 10:2, and benzotriazole (made by BASF Co.) as a UV absorber was further added to the resin mixture in an amount of 0.01 g/m$^2$. The thus prepared resin mixture was coated by a gravure coating method to form the ultraviolet absorber layer 27.

Evaluation:

The thus obtained film mirrors 1 to 15 were each determined according to the methods described below with respect to specular reflectance, weather resistance and UV resistance.

Measurement of Specular Reflectance:

The specular reflectance at a reflection angle of 5° was determined by a spectrophotometer, U-4100, made by Shimazu Seisakusho Corp. in which the incident angle of incident light was adjusted to 5° to normal of the reflection surface. Evaluation was made by determination of an average reflectance over the range of 250 nm to 2500 nm. Incidence was made from the outermost surface side.

Weather Resistance Test of Specular Reflectance:

The specular reflectance of a film mirror which was allowed in advance to stand under conditions of 60° C. and 85% RH while being exposed to light at an exposure intensity of 100 mW/cm$^2$ by using AI Super UV Tester (dewing type, made by Iwasaki Denki Co., Ltd.), was determined similarly to the foregoing measurement of light reflectance. A lowering rate of specular reflectance between before and after the accelerated aging test was determined from the specular reflectance of a film mirror before the accelerated aging test and that of a film mirror after the accelerated aging test. Evaluation criteria of the weather resistance test are shown below.

5: A lowering rate of specular reflectance being less than 5%,
4: A lowering rate of specular reflectance being not less than 5% and less than 10%,
3: A lowering rate of specular reflectance being not less than 10% and less than 15%,
2: A lowering rate of specular reflectance being not less than 15% and less than 20%,
1: A lowering rate of specular reflectance being not less than 20%.

Pencil Hardness Test:

A test was conducted in accordance with the standard of JIS K 5600. The outermost layer of the individual film mirrors was scratched with a pencil at an angle of 45°, while applying a load of 500 g. The hardness was ranked with a hardness mark of a pencil which caused no scratches in at least four out of five times.

Steel Wool Test:

Using #0000 steel wool, the outermost surface of each of the obtained film mirrors 1 to 15 is rubbed back and forth with the steel wool cut to 1 cm² a prescribed number of 100 mm strokes and at a rate of 30 mm/sec, while applying a load of 500 g onto the steel wool. Thereafter, the rubbed surface was visually observed and evaluate based on the following criteria ranks A-E:

A: No scratch was observed,
B: 1 to 10 scratches were observed,
C: 11 to 30 scratches were observed,
D: 31 to 50 scratches were observed,
E: More than 50 scratches were observed.

Electric Resistance Value:

The outermost layer surface of the individual film mirror samples was measured in accordance with the standard of JIS K 7194, provided that, after being allowed to stand in an atmosphere of 50% r.h. and a temperature of 50° C., a sample was measured at five points within a probe (ASP Probe, made by Mitsubishi Kagaku Co., Ltd.) in which probe needles were linearly arranged linearly at regular intervals of 5 mm. An average value of five points was defined as the electric resistance value.

Outdoor Exposure Test:

An adhesive layer was coated on the protective later of each of film mirrors 1-10 or on the opposite side to the corrosion proof layer of a biaxially stretched polyester film of each of film mirrors 11 to 15, and the adhesive layer was adhered to the aluminum substrate to prepare a reflection device used for solar power generation. The thus prepared reflection device was set at an angle of 45 degrees to the ground in a sand box of 10 m square. Further, the measurement was conducted in the same manner as above, after washing the outermost film surface with a given brush and water. A coating solution for the adhesive layer was an acrylic adhesive (TL-75K, made by Lintech Corp.) and the coated layer thickness was 50 μm.

The contents of the thus obtained film mirrors 1-15 are shown in Table 1 and evaluation results are shown in Table 2.

TABLE 1

| Film Mirror No. | Material of Substrate | Substrate Thickness | Corrosion Inhibitor Layer | Antistaticity | Hard Coatability | Gas Barrier Layer | UV Absorber | Remark |
|---|---|---|---|---|---|---|---|---|
| 1 | acryl resin | 75 μm | silver-adsorptive corrosion inhibitor | Yes | — | — | — | Comp. |
| 2 | acryl resin | 75 μm | — | — | Yes | — | — | Comp. |
| 3 | PET | 100 μm | silver-adsorptive corrosion inhibitor | Yes | Yes | — | — | Inv. |
| 4 | acryl resin | 75 μm | silver-adsorptive corrosion inhibitor | Yes | Yes | — | — | Inv. |
| 5 | acryl resin | 75 μm | silver-adsorptive corrosion inhibitor | Yes | Yes | Yes | — | Inv. |
| 6 | acryl resin | 75 μm | silver-adsorptive corrosion inhibitor | Yes | Yes | Yes | — | Inv. |
| 7 | acryl resin | 75 μm | antioxidant | Yes | Yes | Yes | — | Inv. |
| 8 | acryl resin | 75 μm | silver-adsorptive corrosion inhibitor | Yes | Yes | Yes | Yes | Inv. |
| 9 | acryl resin | 125 μm | silver-adsorptive corrosion inhibitor | Yes | Yes | Yes | Yes | Inv. |
| 10 | acryl resin | 75 μm | silver-adsorptive corrosion inhibitor | Yes | Yes | — | — | Inv. |
| 11 | PET | 100 μm | silver-adsorptive corrosion inhibitor | Yes | Yes | — | — | Inv. |
| 12 | PET | 100 μm | silver-adsorptive corrosion inhibitor | Yes | Yes | Yes | — | Inv. |
| 13 | PET | 100 μm | silver-adsorptive corrosion inhibitor | Yes | Yes | Yes | — | Inv. |
| 14 | PET | 100 μm | silver-adsorptive corrosion inhibitor | Yes | Yes | Yes | — | Inv. |
| 15 | PET | 100 μm | silver-adsorptive corrosion inhibitor | Yes | Yes | Yes | Yes | Inv. |

TABLE 2

| Film Mirror No. | Layer Constitution | Specular reflectance (%) | Weather Proofing Rank | Pencil Hardness | Steel Wool Test | resistance ohms per square | Outdoor Exposure Test, Specular Reflectance (%) | | Remark |
|---|---|---|---|---|---|---|---|---|---|
| | | | | | | | After being allowed to stand | After being allowed to stand and washed | |
| 1 | Rear face mirror | 94 | 2 | 4B | E | $2 \times 10^7$ | 70 | 85 | Comp. |
| 2 | | 93 | 2 | 2H | B | $>10^{15}$ | 69 | 89 | Comp. |
| 3 | | 94 | 2 | 2H | A | $5.6 \times 10^8$ | 70 | 93 | Inv. |
| 4 | | 94 | 2 | 2H | A | $3.5 \times 10^8$ | 69 | 93 | Inv. |
| 5 | | 95 | 4 | 2H | A | $1.9 \times 10^8$ | 75 | 94 | Inv. |
| 6 | | 93 | 4 | 2H | A | $2.2 \times 10^7$ | 82 | 93 | Inv. |
| 7 | | 94 | 5 | 2H | A | $1.5 \times 10^7$ | 82 | 94 | Inv. |
| 8 | | 94 | 5 | 2H | A | $1.3 \times 10^7$ | 90 | 95 | Inv. |
| 9 | | 95 | 5 | 2H | A | $1.9 \times 10^7$ | 91 | 95 | Inv. |

TABLE 2-continued

| Film Mirror No. | Layer Constitution | Specular reflectance (%) | Weather Proofing Rank | Pencil Hardness | Steel Wool Test | resistance ohms per square | Outdoor Exposure Test, Specular Reflectance (%) | | Remark |
|---|---|---|---|---|---|---|---|---|---|
| | | | | | | | After being allowed to stand | After being allowed to stand and washed | |
| 10 | | 95 | 4 | H | B | $1.6 \times 10^7$ | 90 | 91 | Inv. |
| 11 | Front face | 95 | 5 | 2H | A | $5.5 \times 10^5$ | 83 | 95 | Inv. |
| 12 | mirror | 96 | 5 | 2H | A | $6.9 \times 10^5$ | 86 | 95 | Inv. |
| 13 | | 96 | 5 | 2H | A | $7.8 \times 10^3$ | 87 | 96 | Inv. |
| 14 | | 96 | 5 | 2H | A | $1.5 \times 10^3$ | 89 | 96 | Inv. |
| 15 | | 96 | 5 | 2H | A | $3.2 \times 10^3$ | 91 | 96 | Inv. |

As is apparent from the evaluation results shown in Table 2, it was proved that examples related to the present invention are superior in various characteristics, compared to comparative examples.

Examples 1-10 showed a constitution of a rear face mirror and Examples 11-15 showed a constitution of a front face mirror. Of the layer constitution, a silver reflection layer exhibits a very high electric conductivity. A front face mirror, in which the distance between an outermost layer and a silver reflection layer was small, exhibited a relatively low electric resistivity. On the contrary, a rear face mirror, in which a thick resin layer existed between the outermost layer and the silver reflection layer, exhibited an enhanced weather resistance but electrons were not able to reach the silver reflection layer, preventing a lowering of electric resistance.

Further, with respect to the results of washing samples left outdoors, film mirror 1 which had no hard coat on its surface, was injured, resulting in a lowering of reflectance. In the case of film mirror 2, reflectance was recovered by strongly washing, however, washing the mirror similarly to film mirrors 3 to 15, resulted in a lower reflectance than film mirrors 3 to 15 of the invention.

Film mirrors 3-10 of rear face mirrors, did not result in a lowering of electric resistance value and exhibited enhanced weather resistance, whereby reflectance was maintained to an extent equivalent to a front face mirror, even when exposed outdoors. On the other hand, a front face mirror was low in electric resistance but exhibited a lower weather resistance than a rear face mirror.

It was also proved that film mirror 3 containing an inorganic double oxide in the outermost layer exhibited an electric resistance value equivalent to or slightly higher than a film mirror 10 which did not contain an inorganic double oxide, but was superior in hardness, and exhibiting enhanced reflectance even when washed after being exposed outdoors.

From these results, it was proved that reflectance of solar light could be maintained over a long period of time by controlling hardness and an electric resistance value of the outermost layer. Namely, it was proved that according to the foregoing means of the invention, there was provided a film mirror in which a lowering of specular reflectance, due to deterioration of a silver reflection layer was inhibited and which was light and flexible, low in production cost, attained a large area and mass production, was superior in weather resistance and anti-staining and exhibited excellent specular reflectance to solar light over a long period of time.

REFERENCE EXAMPLES

There will be further described other preferred embodiments by employing reference examples and comparative examples for the reference examples, with reference to FIGS. 3 and 4. In the following, the expression, "comparison example" represents a comparison example for a reference example.

Comparison Example 1

Figure 3A:
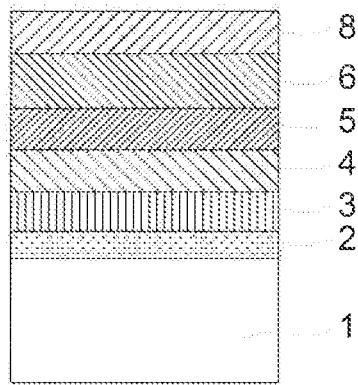
FIG. 3a shows the sectional view of the layer structure of a film mirror of comparison example 1 of reference examples and FIG. 3b shows the sectional view of the layer structure of a film mirror of comparison example 2 of reference examples.

FIG. 3a shows constitution of Comparison Example 1.

There was used a biaxially oriented polyester film (polyethylene terephthalate film, thickness of 100 µm) as a resin substrate (1). A mixture of lanthanum oxide and aluminum oxide in a ration of 8:2 was deposited on one side of the polyester film by a process of vacuum vapor deposition to form a 60 nm thick adhesion layer (2). Subsequently, copper was deposited thereon by vapor deposition to form a 100 nm thick metal layer (3), and a 150 nm thick silver reflection layer (4) was similarly formed by vapor deposition. Then, a polyester resin and a TDI (tolylene diisocyanate) type isocyanate were mixed in a solid content ratio of 10:2, methyl ethyl ketone, as a solvent was added thereto and mixed with glycol dimercaptoacetate (made by Wako Junyaku Co., Ltd.) in an amount of 0.05 g/m², and the thus obtained mixture was coated on the silver reflection layer to form a 100 nm thick corrosion proof layer (5). Further thereon, a solution of 3% perhydropolysilazane (NL 120, made by Client Co.) dissolved in dibutyl ether was coated by a bar coating method so as to form a 100 nm thick dry film, naturally dried over 3 minutes and annealed in an oven at 70° C. over 30 minutes to obtain a gas barrier layer (6). Next, an acryl resin containing a silane group at the end or a side chain of the polymer and a 3% platinum complex catalyst were mixed and the thus obtained mixture was coated on the substrate by spray coating to form a hydrophilic and stain-resistant uppermost surface layer (8), whereby a sample of comparison example 1 was obtained.

Comparison Example 2

Figure 3B:
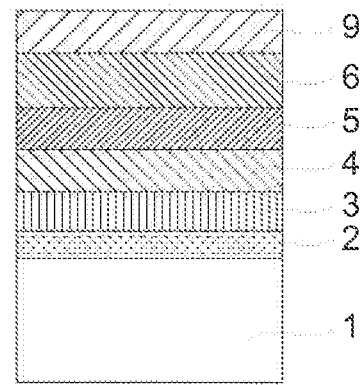

FIG. 3b shows constitution of comparison example 2.

Comparison example 2 was prepared in the same manner as comparison example 1, except that the hydrophilic uppermost surface layer of the sample obtained in the foregoing comparative example 1 was replaced by a scratch-resistant, uppermost surface layer 9 which was formed by coating a solution of 69% by mass of LAROMER PO 90226 (photocurable acrylate resin; made by BASF Japan Co., Ltd.) mixed with 30% by mass of amorphous silica and 1% by mass of a photoinitiator, was bar-coated so as to form a dry thickness of 3 µm and dried at 80° C., followed by UV curing.

Figure 4A:
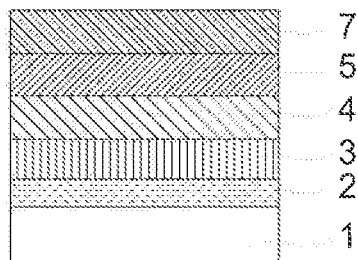
FIG. 4a shows a sectional view of the layer structure of a film mirror of reference examples 1-5 and FIG. 4b shows the sectional view of the layer structure of a film mirror of reference examples 6 and 7.

FIG. 4a shows constitution of reference examples 1-5.

Reference Example 1

There was used a biaxially oriented polyester film (polyethylene terephthalate film, thickness of 100 µm) as a resin substrate (1). A mixture of lanthanum oxide and aluminum oxide in a ration of 8:2 was deposited on one side of the polyester film by a process of vacuum vapor deposition to form a 60 nm thick adhesion layer (2). Subsequently, copper was deposited thereon by vapor deposition to form a 100 nm thick metal layer (3), and a 150 nm thick silver reflection layer (4) was similarly formed by vapor deposition. Then, a polyester resin and a TDI (tolylene diisocyanate) type isocyanate were mixed in a solid content ratio of 10:2, methyl ethyl ketone, as a solvent was added thereto and mixed with glycol dimercaptoacetate (made by Wako Junyaku Co., Ltd.) in an amount of 0.05 g/m$^2$, and the thus obtained mixture was coated on the silver reflection layer to form a 100 nm thick corrosion proof layer (5). On the corrosion proof layer was coated Opstar Z 7537 (JSR) at a thickness of 5 µm and cured by exposure to UV rays to form a stain-preventing and scratch resistant uppermost surface layer (7), whereby a sample of reference example 1 was obtained.

Reference Example 2

A sample of reference example 2 was prepared in the same layer constitution as reference example 1, except that an acryl resin film was used in place of the substrate of a sample of reference example 1.

Reference Example 3

A sample of reference example 3 was prepared in the same layer constitution as reference example 1, except that the uppermost surface layer of gas barrier property was provided in place of the uppermost surface layer of reference example 1. Specifically, a solution of 3% perhydropolysilazane (NL 120, made by Client Co.) dissolved in dibutyl ether was coated by a bar coating method so as to form a 100 nm thick dry film, then, naturally dried over 3 minutes and annealed in an oven at 70° C. over 30 minutes to obtain a gas barrier layer (7).

Reference Example 4

A sample of reference example 4 was prepared in the same manner as in reference example 3, except that "Hydrophobilization Accelerator" (product name), made by AZ Electronics Co. was coated on the uppermost surface layer of gas barrier property to achieve enhanced hydrophilicity of the uppermost surface layer (7).

Reference Example 5

A sample of reference example 5 was prepared in the same manner as in reference example 4, except glycol dimercaptoacetate (silver-adsorptive corrosion inhibitor) of the corrosion proof layer (5) was replaced by 2,2'-methylenebis(4,6-di-t-butylphenyl)octylphosphite (antioxidant) in an amount of 0.01 g/m$^2$.

Figure 4B:
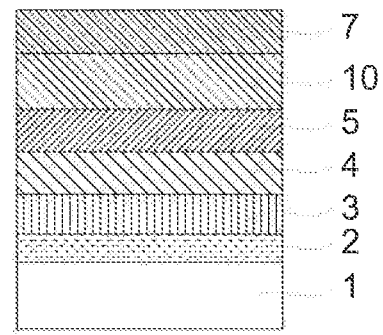

FIG. 4b shows constitution of reference examples 6 and 7.

Reference Example 6

A sample of reference example 6 was prepared in the same manner as in reference example 4, except a composition in which methyl ethyl ketone was added a mixture of a polyester resin and TDI (tolylene diisocyanate) type isocyanate in a solid content ratio of 10:2 and benzotriazole was contained in an amount of 0.01 g/m$^2$, was coated on the corrosion proof layer 5 to form a 100 nm thick UV absorber layer (10) and further thereon, the uppermost surface layer (7) was provided.

Reference Example 7

A sample of reference example 7 was prepared in the same manner as in reference example 6, except that the biaxially oriented polyester film (polyethylene terephthalate film, thickness of 100 µm) as a resin substrate (1) was replaced by a biaxially oriented polyester film (polyethylene terephthalate film, thickness of 175 µm).
Evaluation:
The thus obtained film mirrors were each determined according to the methods described below with respect to specular reflectance, weather resistance and UV resistance.
Measurement of Specular Reflectance:
The specular reflectance at a reflection angle of 5° was determined by a modified spectrophotometer in which an integrating sphere attachment was loaded to a spectrophotometer UV 265, made by Shinazu Seisakusho Corp. and the incident angle of incident light was adjusted to 5° to normal of the reflection surface. Evaluation was made by determination of an average reflectance over the range of 250 nm to 2500 nm.

Figure 5A:
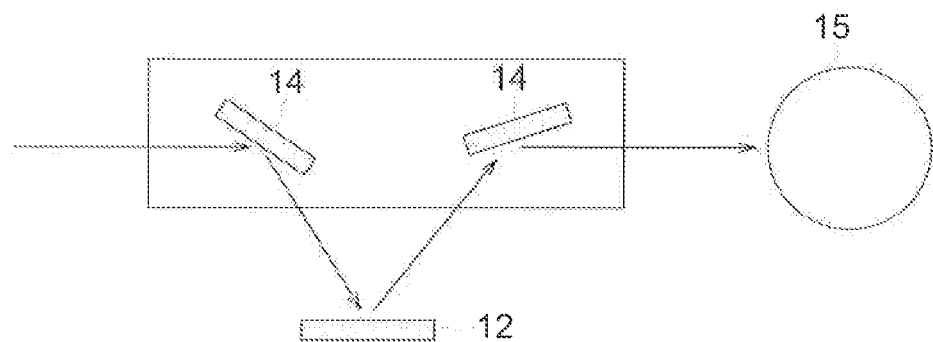
FIG. 5 shows a schematic depiction of a measurement device for specular reflectance.
Figure 5B:
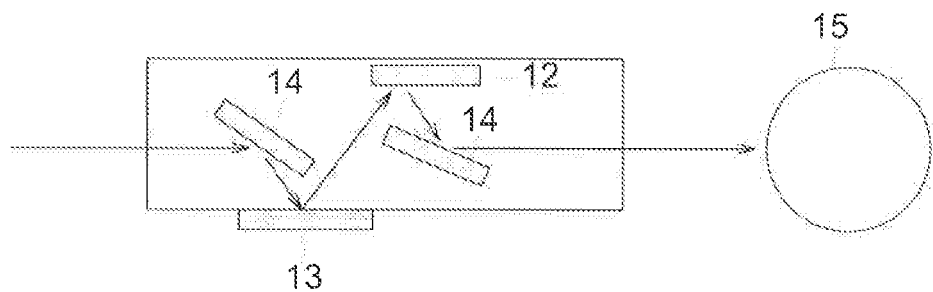

FIGS. 5a and 5b illustrate a measurement method of specular reflectance. FIG. 5a shows the arrangement of a mirror (14) and reference mirror (12), and FIG. 5b shows the arrangement of the mirror (14), the reference mirror (12) and a sample (13). The numeral 15 is an integrating sphere.
Weather Resistance Test of Specular Reflectance:
The specular reflectance of a film mirror which was allowed to stand under conditions of 85° C. and 85% RH while being exposed to a xenon lamp, was determined similarly to the foregoing measurement of light reflectance. A lowering rate of specular reflectance between before and after the accelerated aging test was determined from the specular reflectance of a film mirror before the accelerated aging test and that of a film mirror after the accelerated aging test. Evaluation criteria of the weather resistance test are shown below.

5: A lowering rate of specular reflectance being less than 5%,

4: A lowering rate of specular reflectance being not less than 5% and less than 10%, 3: A lowering rate of specular reflectance being not less than 10% and less than 15%, 2: A lowering rate of specular reflectance being not less than 15% and less than 20%, 1: A lowering rate of specular reflectance being not less than 20%.
Pencil Hardness Test:
A test was conducted in accordance with the standard of JIS K 5600. The outermost layer of the individual film mirrors was scratched with a pencil at an angle of 45°, while applying a load of 500 g. The hardness was ranked with a hardness mark of a pencil which caused no scratches in at least four out of five times.
Steel Wool Test:
Contact Angle Test:
Based on JIS-R 3257, 3 µL of water was dropped onto a film mirror and a contact angle on the film mirror surface was measured by using a contact angle meter, DM 300 (made by Kyowa Kaimen Kagaku Co., Ltd.).
Outdoor Exposure Test:
A reflection device used for solar power generation was prepared in which samples prepared examples were each adhered an aluminum substrate. The thus prepared reflection device was set at an angle of 45 degrees to the ground in a sand box and allowed to stand over one month, and then, the specular reflectance was measured. Further, the measurement was conducted in the same manner as above, after washing the outermost film surface with a given brush and water.

The Contents of the thus obtained film mirrors 1-15 are shown in Table 3 and evaluation results are shown in Table 42.

proved that according to the foregoing means of the invention, there was provided a film mirror in which a lowering of specular reflectance, due to deterioration of a silver reflection layer was inhibited and which was light and flexible, low in production cost, attained a large area and mass production, was superior in weather resistance and anti-staining and exhibited excellent specular reflectance to solar light over a

TABLE 3

|  | Kind of Substrate | Substrate Thickness | Corrosion Inhibitor Layer | Uppermost Surface Layer | | UV Absorber | Gas Barrier Layer |
| --- | --- | --- | --- | --- | --- | --- | --- |
|  |  |  |  | Stain-proofing | Hard Coat Property |  |  |
| Comparison Example 1 | PET | 100 μm | *1 | Yes | — | — | — |
| Comparisone Example 2 | PET | 100 μm | — | — | Yes | — | — |
| Reference Example 1 | PET | 100 μm | *1 | Yes | Yes | — | — |
| Reference Example 2 | acryl resin | 100 μm | *1 | Yes | Yes | — | — |
| Reference Example 3 | PET | 100 μm | *1 | Yes | Yes | — | Yes |
| Reference Example 4 | PET | 100 μm | *1 | Yes | Yes | — | Yes |
| Reference Example 5 | PET | 100 μm | *2 | Yes | Yes | — | Yes |
| Reference Example 6 | PET | 100 μm | *1 | Yes | Yes | Yes | Yes |
| Reference Example 7 | PET | 175 μm | *1 | Yes | Yes | Yes | Yes |

*1: Silver-adsorptive corrosion inhibitor
*2: Antioxidant

TABLE 4

|  | Weather Resistance | Pencil Hardness | Contact Angle (°) | Outdoor Exposure Test Specular Reflectance (%) | | |
| --- | --- | --- | --- | --- | --- | --- |
|  |  |  |  | Before Test | 1 Month After Test | Washing*1 |
| Comparisone Example 1 | 4 | 4B | 35 | 94 | 87 | 85 |
| Comparison Example 2 | 4 | 2H | 86 | 94 | 62 | 89 |
| Reference Example 1 | 3 | 2H | 66 | 94 | 80 | 94 |
| Reference Example 2 | 3 | 2H | 68 | 94 | 79 | 93 |
| Reference Example 3 | 4 | 2H | 47 | 95 | 87 | 94 |
| Reference Example 4 | 4 | 2H | 21 | 93 | 91 | 93 |
| Reference Example 5 | 5 | 3H | 20 | 94 | 91 | 94 |
| Reference Example 6 | 5 | 2H | 23 | 94 | 90 | 94 |
| Reference Example 7 | 5 | 3H | 21 | 95 | 92 | 95 |

*1Washing at the time of 1 Month After Test

As is apparent from the evaluation results shown in Table 4, it was proved that reference examples related to the present invention are superior in various characteristics, as compared to comparison examples. Specifically, with respect to the results of washing samples left outdoors, comparison example 1 which had no hard coat on the surface, was injured, resulting in a lowering of reflectance. In the case of comparison example 2, reflectance was recovered by strong washing however, washing the mirror similarly to reference examples, resulted in a lower reflectance than examples. Namely, it was long period of time. Specifically, it was proved that, the use of the uppermost layer exhibiting a contact angle of not more than 30° resulted in a low reflectance even without washing.

DESCRIPTION OF NUMERICAL DESIGNATIONS

1: Resin substrate
2: Adhesive layer
3: Metal layer

4: Silver reflection layer
5: Corrosion proof layer
6: Gas barrier layer
7: Outermost layer (anti-staining and scratch resistance)
8: Outermost layer (anti-staining)
9: Outermost layer (scratch resistance)
10: UV absorption layer
21: Resin substrate
22: Silver reflection layer
23: Outermost layer
24: Protective layer
25: Corrosion proof layer
26: Gas barrier layer
27: UV absorbing layer

What is claimed is:

1. A film mirror comprising
a resin substrate and
a silver reflection layer provided on at least one side of the resin substrate,
wherein the film mirror comprises an outermost layer on a light incident side and a surface of the outermost layer exhibits an electric surface resistivity value of $1.0 \times 10^{-3}$ to $1.0 \times 10^{9}$ ohms per square, a pencil hardness of not less than H and less than 6H, and not more than 30 scratches in a steel wool test under a load of 500 g/cm$^2$.

2. The film mirror, as claimed in claim 1, wherein the outermost layer contains inorganic double oxide particles.

3. The film mirror as claimed in claim 1, wherein the outermost layer contains an acrylate or urethane resin.

4. The film mirror as claimed in claim 1, wherein corrosion proof layers are provided on both surfaces of the silver reflection layer.

5. The film mirror as claimed in claim 4, wherein a gas barrier layer is provided between each of the corrosion resistant layers and the resin substrate.

6. The film mirror as claimed in claim 1, wherein an ultraviolet absorbent is contained in any layer between the silver reflection layer and the resin substrate or except the silver reflection layer.

7. The film mirror as described in claim 1, wherein a total thickness of the film mirror is within a range of 75 to 250 μm.

8. A film mirror for solar power generation, wherein the film mirror for solar power generation is the film mirror as claimed in claim 1.

9. A reflection device for solar power generation, wherein after an adhesive layer is coated on a surface opposite from the light incident side of the film mirror for solar power generation as claimed in claim 8, the film mirror for solar power generation is adhered to a metal substrate through the adhesive layer to form the device.

* * * * *